(12) United States Patent
Moon et al.

(10) Patent No.: US 11,099,698 B2
(45) Date of Patent: Aug. 24, 2021

(54) TOUCHSCREEN PANEL AND TOUCHSCREEN INTEGRATED DISPLAY DEVICE

(71) Applicant: LG Display Co., Ltd., Seoul (KR)

(72) Inventors: Young-Gyu Moon, Seoul (KR); Chang-Seok Oh, Daegu (KR)

(73) Assignee: LG DISPLAY CO., LTD., Seoul (KR)

( * ) Notice: Subject to any disclaimer, the term of this patent is extended or adjusted under 35 U.S.C. 154(b) by 29 days.

(21) Appl. No.: 16/546,022

(22) Filed: Aug. 20, 2019

(65) Prior Publication Data
US 2020/0201485 A1 Jun. 25, 2020

(30) Foreign Application Priority Data
Dec. 21, 2018 (KR) .......................... 10-2018-0167447

(51) Int. Cl.
| | |
|---|---|
| *G06F 3/044* | (2006.01) |
| *G06F 3/047* | (2006.01) |
| *G06F 3/041* | (2006.01) |

(52) U.S. Cl.
CPC ............ *G06F 3/0446* (2019.05); *G06F 3/047* (2013.01); *G06F 3/0412* (2013.01); *G06F 2203/04112* (2013.01)

(58) Field of Classification Search
CPC ...... G06F 3/0446; G06F 3/0412; G06F 3/047; G06F 2203/04112; G06F 3/04166; G06F 3/0442; G06F 3/0443; G06F 3/0448; G06F 3/041
See application file for complete search history.

(56) References Cited

U.S. PATENT DOCUMENTS

| | | | | |
|---|---|---|---|---|
| 2017/0177160 | A1* | 6/2017 | Oh ....................... | G06F 3/0412 |
| 2017/0242541 | A1* | 8/2017 | Iuchi ................... | G06F 3/04182 |
| 2018/0033800 | A1* | 2/2018 | Koide .................. | G06F 3/0445 |
| 2018/0138261 | A1* | 5/2018 | Lee ..................... | H01L 27/3276 |
| 2018/0149920 | A1* | 5/2018 | Yamazaki ............. | G06F 3/0443 |
| 2018/0188432 | A1* | 7/2018 | Choi ..................... | H01Q 7/00 |
| 2018/0203558 | A1* | 7/2018 | Shim ..................... | G06F 3/0393 |
| 2019/0018519 | A1* | 1/2019 | Kim ...................... | G06F 3/0446 |

* cited by examiner

*Primary Examiner* — Andrew Sasinowski
(74) *Attorney, Agent, or Firm* — Polsinelli PC

(57) ABSTRACT

Disclosed is a touchscreen panel capable of achieving an enhancement in active pen touch performance while securing a desired finger touch performance. A touchscreen integrated display device using the touchscreen panel is also disclosed. The touchscreen panel includes first touch electrodes each extending in a first direction while having a bar shape, second touch electrodes insulated from the first touch electrodes, each second touch electrode extending in a second direction while having a bar shape, to overlap with the first touch electrodes at predetermined portions thereof, first wing patterns formed at opposite longitudinal sides of each first touch electrode in regions where the first touch electrode does not overlap with the second touch electrodes, respectively, and second wing patterns formed at opposite longitudinal sides of each second touch electrode in regions where the second touch electrode does not overlap with the first touch electrodes, respectively.

19 Claims, 11 Drawing Sheets

[First Embodiment]

[Second Embodiment]

| Design | Pen | Center(fF) | Shift(fF) | Variation(%) | Remarks |
|---|---|---|---|---|---|
| Bar | Tx2 | 7.2 | 6.2 | −13.1 | Decrease |
| | Tx1 | 5.2 | 6.9 | 32.7 | Increase |
| Wing | Tx2 | 7.8 | 7.1 | −8.4 | Decrease |
| | Tx1 | 5.4 | 7.0 | 29.8 | Increase |

TOUCHSCREEN PANEL AND TOUCHSCREEN INTEGRATED DISPLAY DEVICE

CROSS-REFERENCE TO RELATED APPLICATION

This application claims the benefit of Korean Patent Application No. 10-2018-0167447, filed on Dec. 21, 2018, which is hereby incorporated by reference in its entirety.

BACKGROUND

Field of the Disclosure

The present disclosure relates to a display device, and more particularly to a touchscreen panel with an enhanced active pen touch performance and a touchscreen integrated display device using the same.

Description of the Background

Image display devices, which render a variety of information on a screen, are core technologies of the information communication age, and are being developed toward further thinness, further lightness, portability, and higher performance. As such, flat display devices such as liquid crystal display devices or organic light emitting display devices are commercially available.

Currently, such flat display devices are mainly used in the form of mobile flat display devices such as smartphones or notebook computers, by virtue of advantages thereof such as superior picture quality, lightness, thinness, and low power consumption. In addition, such flat display devices are being diversely used in computer monitors, televisions, and the like.

Among these display devices, organic light emitting devices, which are configured to display an image through control of light emission of an organic light emitting layer, use a self-luminous light emitting element and, as such, do not require a separate light source. In this regard, such an organic light emitting device may be driven at a low voltage, and has superior characteristics such as a thin structure, a superior viewing angle and a fast response time.

The organic light emitting device as mentioned above includes pixels each including an organic light emitting element, and banks dividing the pixels from one another, to define the pixels. The banks may function as pixel defining films, respectively. The organic light emitting element includes an anode, a hole transporting layer, an organic light emitting layer, an electron transporting layer, and a cathode. In this case, when a high-level voltage is applied to the anode, and a low-level voltage is applied to the cathode, holes and electrons migrate to the organic light emitting layer via the hole transporting layer and the electron transporting layer, respectively, and are then coupled in the organic light emitting layer, and, as such, light emission is achieved.

Recently, active research into a touchscreen integrated organic light emitting device including a touchscreen panel capable of recognizing touch of the user has been conducted.

The touchscreen panel includes first touch electrodes arranged in a first direction, and second touch electrodes arranged in a second direction such that the first and second touch electrodes intersect each other. The first and second touch electrodes are electrically isolated from each other. One of the first and second touch electrodes functions as a driving electrode Tx for applying a touch signal, and the other of the first and second touch electrodes functions as a sensing electrode Rx for sensing a variation in capacitance caused by touch, thereby sensing touch.

Meanwhile, active research is being conducted to apply a metal mesh electrode having low resistance while having superior flexibility to touch electrodes in manufacture of a flexible touchscreen integrated organic light emitting device. Such a metal mesh electrode exhibits high reflectance, as compared to a transparent conductive material, and, as such, may have a high possibility to be externally visible. Furthermore, there may be a problem in that the metal mesh electrode degrades the brightness of the entirety of the organic light emitting device.

In order to solve such problems, metal mesh electrodes are aligned with banks, which are non-emission areas, in order to prevent the metal mesh electrodes from being visible.

The first touch electrodes include a plurality of first mesh electrodes arranged in the first direction in the form of bars while being electrically connected. The second touch electrodes include a plurality of second mesh electrodes arranged in the second direction in the form of bars while being electrically connected.

Meanwhile, the flexible organic light emitting display device as mentioned above requires a smaller thickness in order to minimize folding stress. In connection with this, a technology to provide a flexible in-cell organic light emitting display device capable of achieving a reduction in thickness has been proposed. In such a device, however, the distance between each touch electrode and a cathode of the corresponding organic light emitting element is too small and, as such, parasitic capacitance may be frequently generated between the touch electrode and the cathode. Upon touch driving, the parasitic capacitance functions as a heavy load, thereby causing an increase in RC delay time. As a result, there may be a driving problem.

Furthermore, there may be weak points exhibiting weak sensing force upon active pen touch due to structural characteristics of the first and second touch electrodes arranged in different directions in the form of bars, even though there is no considerable problem upon finger touch.

SUMMARY

Accordingly, the present disclosure is directed to a touchscreen panel and a touchscreen integrated display device that substantially obviate one or more problems due to limitations and disadvantages of the related art.

The present disclosure is to provide a touchscreen panel capable of achieving an enhancement in active pen touch performance while securing a desired finger touch performance, and a touchscreen integrated display device using the same.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve the above and other advantages and in accordance with the purpose of the disclosure, as embodied and broadly described herein, a touchscreen panel includes first touch electrodes each extending in a first direction while having a bar shape, second touch electrodes insulated from the first touch electrodes, each of the second touch electrodes extending in a second direction while having a bar shape, to overlap with the first touch electrodes at predetermined portions thereof, first wing patterns formed at opposite longitudinal sides of each of the first touch electrodes in regions where the first touch electrode does not overlap with the second touch electrodes, respectively, and second wing patterns formed at opposite longitudinal sides of each of the second touch electrodes in regions where the second touch electrode does not overlap with the first touch electrodes, respectively.

The first wing patterns may be electrically connected to the first touch electrode in regions where the first touch electrode overlaps with the second touch electrodes, respectively, and the second wing patterns may be electrically connected to the second touch electrode in regions where the second touch electrode overlaps with the first touch electrodes, respectively.

a distance between the first wing pattern and the first touch electrode increase as the first wing pattern extends away from the region where the first touch electrode overlaps with the second touch electrode, and a distance between the second wing pattern and the second touch electrode increase as the second wing pattern extends away from the region where the second touch electrode overlaps with the first touch electrode.

Each of the first and second wing patterns may have a triangular shape, a semi-oval shape, or a polygonal shape.

At least two the first wing patterns and at least two second wing patterns are located in one region where the first touch electrode does not overlap with the second touch electrodes.

Each of the first and second touch electrodes may has a metal mesh structure constituted by a plurality of lines.

The first touch electrodes may be arranged in a direction parallel to scan lines of a display panel, and the plurality of lines constituting the metal mesh structure in each of the first touch electrodes have a linear shape.

The second touch electrodes may be arranged in a direction parallel to data lines of a display panel, and the plurality of lines constituting the metal mesh structure in each of the second touch electrodes may have a wave shape or a diamond line shape.

The first or second wing patterns may have a wave shape.

In another aspect of the present disclosure, a touchscreen integrated display device includes a display panel for displaying an image, and a touchscreen panel bonded to the display panel, to recognize touch of a user, wherein the touchscreen panel includes first touch electrodes each extending in a first direction while having a bar shape, second touch electrodes insulated from the first touch electrodes, each of the second touch electrodes extending in a second direction while having a bar shape, to overlap with the first touch electrodes at predetermined portions thereof, first wing patterns formed at opposite longitudinal sides of each of the first touch electrodes in regions where the first touch electrode does not overlap with the second touch electrodes, respectively, and second wing patterns formed at opposite longitudinal sides of each of the second touch electrodes in regions where the second touch electrode does not overlap with the first touch electrodes, respectively.

The display panel may include a liquid crystal display panel or an organic light emitting display panel.

The touchscreen panel and the touchscreen integrated display device, which have the above-described features, provide the following effects.

It may be possible to provide an enhanced active pen touch performance while securing a desired finger touch performance as the first and second touch electrodes having bar shapes are arranged to intersect each other, and the first and second wing patterns are formed at opposite longitudinal sides of the first and second touch electrodes in regions where the first touch electrodes and the second touch electrodes do not overlap each other.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate aspect(s) of the disclosure and along with the description serve to explain the principle of the disclosure.

In the drawings.

DETAILED DESCRIPTION

Figure 1:
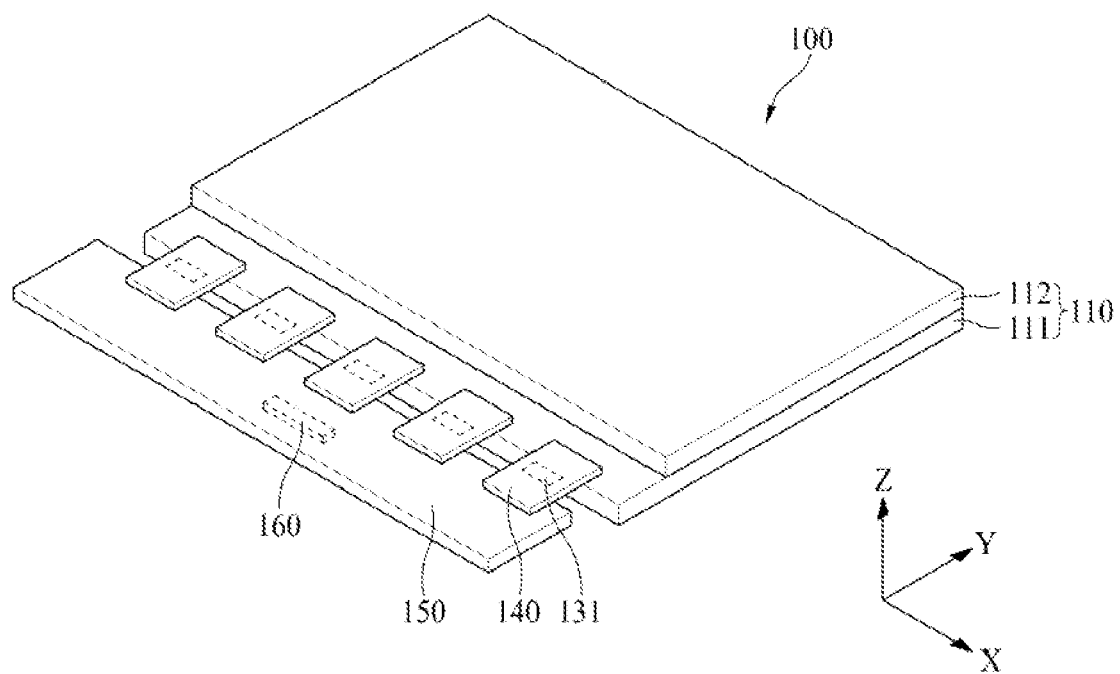
FIG. 1 is a perspective view illustrating a touchscreen integrated display device according to an aspect of the present disclosure.

Hereinafter, various aspects of the present disclosure will be described in detail with reference to the accompanying drawings. The advantages, features and methods of achieving the same of the present disclosure will be more clearly understood from the following detailed description taken in conjunction with the accompanying drawings. However, the present disclosure is not limited to a variety of aspects described below and can be implemented in various forms. The aspects of the present disclosure are provided only to completely disclose the present disclosure and fully inform a person having ordinary knowledge in the field to which the present disclosure pertains of the scope of the present disclosure. Accordingly, the present disclosure is defined by the scope of the claims.

The shape, size, ratio, angle, number and the like shown in the drawings to illustrate the aspects of the present disclosure are only for illustration and are not limited to the contents shown in the drawings. Wherever possible, the same reference numbers will be used throughout the drawings to refer to the same or like parts. In the following description, detailed descriptions of technologies or configurations related to the present disclosure may be omitted so as not to unnecessarily obscure the subject matter of the present disclosure.

When terms such as "including", "having" and "comprising" are used throughout the specification, an additional component may be present, unless "only" is used. A component described in a singular form encompasses components in a plural form unless particularly stated otherwise.

It should be interpreted that the components included in the aspect of the present disclosure include an error range, although there is no additional particular description thereof.

In describing a variety of aspects of the present disclosure, when terms for positional relationship such as "on", "above", "under" and "next to" are used, at least one intervening element may be present between two elements unless "right" or "direct" is used.

In the meantime, although terms including an ordinal number, such as first or second, may be used to describe a variety of constituent elements, the constituent elements are not limited to the terms, and the terms are used only for the purpose of discriminating one constituent element from other constituent elements.

The respective features of various aspects according to the present disclosure can be partially or entirely joined or combined and technically variably related or operated, and the aspects can be implemented independently or in combination.

It will be understood that, although the terms first, second, A, B, (a), (b), etc. may be used herein to describe various elements of the present disclosure, these terms are only used to distinguish one element from another element and necessity, order, sequence of corresponding elements, numbers, etc. are not limited by these terms. In cases where an element is "connected", "coupled" or "linked" to the other element, it should be understood that the element may be directly connected, coupled or linked to the other element, or another element may be present therebetween.

A touchscreen integrated display device according to the present disclosure having the above-described features will be described in more detail with reference to the accompanying drawings.

Figure 2:
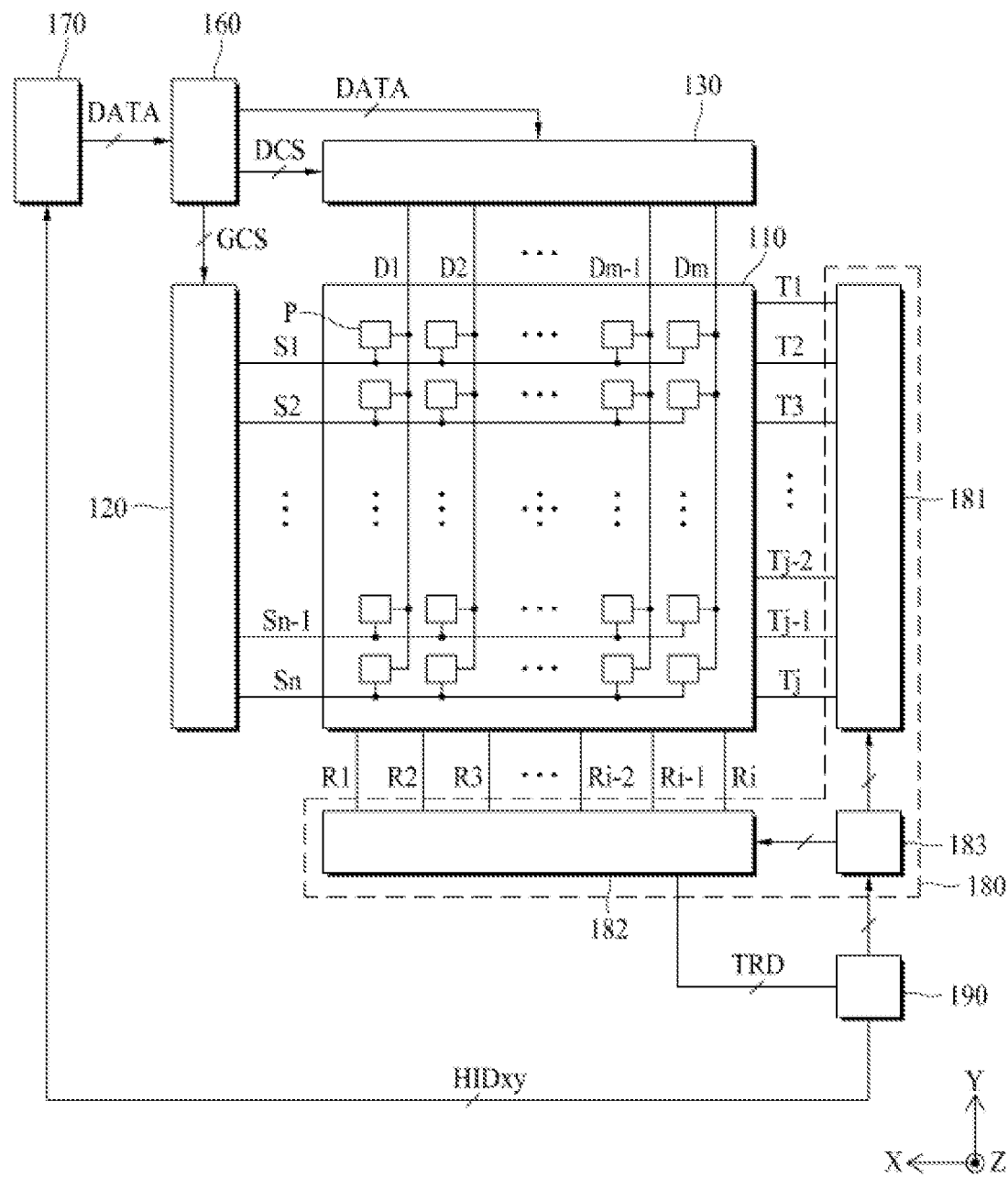
FIG. 2 is a block diagram illustrating the touchscreen integrated display device according to the illustrated aspect of the present disclosure.

FIG. 1 is a perspective view illustrating a touchscreen integrated display device according to an aspect of the present disclosure. FIG. 2 is a block diagram illustrating the touchscreen integrated display device according to the illustrated aspect of the present disclosure.

Referring to FIGS. 1 and 2, the touchscreen integrated display device according to the illustrated aspect of the present disclosure includes a display panel 110, a scan driver 120, a data driver 130, a timing controller 160, a host system 170, a touch driver 180, and a touch coordinate calculator 190.

The touchscreen integrated display device according to the illustrated aspect of the present disclosure may be embodied using a liquid crystal display (LCD), a field emission display (FED), a plasma display panel (PDP), an organic light emitting display (OLED), an electrophoretic display (EPD), or the like. The following description will be given mainly in conjunction with the case in which the touchscreen integrated display device according to the illustrated aspect of the present disclosure is embodied using an organic light emitting display device, but the present disclosure is not limited thereto.

The display panel 110 includes a first substrate 111 and a second substrate 112. The second substrate 112 may be an encapsulation substrate. The first substrate 111 may be a plastic film or a glass substrate. The second substrate 112 may be a plastic film, a glass substrate, or an encapsulation film (protective film).

The display panel 110 includes a display area provided with pixels to display an image. The display panel 110 includes data lines D1 to Dm (m being a positive integer greater than 2) and Scan lines S1 to Sn (n being a positive integer greater than 2). The data lines D1 to Dm intersect the scan lines S1 to Sn. Pixels P may be formed at regions defined by intersection structures of the gate lines Sn to Sn and the data lines D1 to Dm, respectively.

Each pixel P of the display panel 110 may be connected to a corresponding one of the data lines D1 to Dm and a corresponding one of the scan lines S1 to Sn. Each pixel of the display panel 110 may include a driving transistor for adjusting a drain-source current in accordance with a data voltage applied to a gate electrode thereof, a switching transistor for supplying a data voltage of the corresponding data line to the gate electrode of the drive transistor upon turning on in response to a scan signal from the corresponding scan line, an organic light emitting diode for emitting light in accordance with the drain-source current from the driving transistor, and a capacitor for storing a voltage across the gate electrode of the driving transistor. In accordance with this configuration, each pixel P may emit light in accordance with the current supplied to the organic light emitting diode thereof.

In addition to the data lines D1 to Dm and the scan lines S1 to Sn, the display panel 110 may be formed with first and second touch electrodes. The first touch electrodes may intersect the second touch electrodes. The first touch electrodes may be connected to a first touch driver 181 via first touch lines T1 to Tj (j being a positive integer greater than 2), respectively. The second touch electrodes may be connected to a second touch driver 182 via second touch lines R1 to Ri (i being a positive integer greater than 2), respectively. Detailed descriptions of the first and second touch electrodes will be given in conjunction with FIG. 3.

The timing controller 160 receives digital video data DATA and timing signals from the host system 170. The timing signals may include a vertical synchronization signal, a horizontal synchronization signal, a data enable signal, a dot clock, etc.

The vertical synchronization signal is a signal defining one frame period. The horizontal synchronization signal is a signal defining one horizontal period required for supply of data voltages to pixels of one horizontal line of the display panel 110. The data enable signal is a signal defining a period in which effective data is input. The dot clock is a signal repeatedly generated at intervals of a short period.

In order to control operation timing of the scan driver 120 and operation timing of the data driver 130, the timing controller 160 generates, based on the timing signals, a data control signal DCS for controlling the operation timing of the data driver 130 and a scan control signal GCS for controlling the operation timing of the scan driver 120. The timing controller 160 outputs the scan control signal GCS to the scan driver 120, and outputs the data control signal DCS to the data driver 130, together with digital video data DATA.

The scan driver 120 sequentially supplies scan signals to the scan lines S1 to Sn in accordance with the scan control signal GCS from the timing controller 160.

The scan driver 120 may be formed in a gate driver in-panel (GIP) manner at a non-display area disposed outside one lateral portion or both lateral portions of a display area in the display panel 110. Alternatively, the scan driver 120 may be manufactured in the form of a driving chip and, as such, may be mounted on a soft film. In this case, the scan driver 120 may be attached in a tape automated bonding manner to the non-display area disposed outside one lateral portion or both lateral portions of the display area in the display panel 110.

After receiving the digital video data DATA and the data control signal DCS from the timing controller 160, the data driver 130 converts the digital video data DATA into positive/negative analog data voltages in accordance with the data control signal DCS, and then supplies the positive/negative analog data voltages to the data lines. That is, pixels, to which data voltages will be supplied, are selected in accordance with the scan signals from the scan driver 120 and, as such, the data voltages are supplied to the selected pixels, respectively.

As illustrated in FIG. 1, the data driver 130 may include a plurality of source drive ICs 131. Each source driver IC 131 may be mounted on a soft film 140 in a chip on film (COF) manner or in a chip on plastic (COP) manner. Output pins of the soft film 140 may be attached to pads provided at the non-display area of the display panel 110 using anisotropic conductive films, respectively. Input pins of the soft film 140 may be attached to a circuit board 150 on which the timing controller 160 is mounted. Accordingly, the plural source drive ICs 131 may be connected between the timing controller 160 and the display panel 110.

The touch driver 180 supplies drive pulses to the first touch electrodes via the first touch lines T1 to Tj, respectively, and senses charge variations at touch points via the second touch lines R1 to Ri, respectively. That is, the description associated with FIG. 2 has been given mainly in conjunction with the case in which the first touch lines T1 to Tj are Tx lines for supplying drive pulses, and the second touch lines R1 to Ri are Rx lines for sensing charge variations at respective touch points.

The touch driver 180 includes a first touch driver 181, a second touch driver 182, and a touch controller 183. The first touch driver 181, the second touch driver 182, and the touch controller 183 may be integrated into a single read-out IC (ROIC).

The first touch driver 181 selects a first touch line to output a drive pulse under control of the touch controller 183, and supplies a drive pulse to the selected first touch line. For example, the first touch driver 181 may supply drive pulses to the first touch lines T1 to Tj in a sequential manner, respectively.

The second touch driver 182 selects second touch lines to receive charge variations of touch points under control of the touch controller 183, and receives charge variations of touch points via the selected second touch lines. The second touch driver 182 samples charge variations of touch points received via the second touch lines R1 to Ri, and converts the received charge variations into touch raw data (TRD) which is digital data.

The touch controller 183 may generate a Tx setup signal to enable the first touch driver 181 to set a first touch line to output a drive pulse, and an Rx setup signal to enable the second touch driver 182 to set a second touch line to receive a touch sensing voltage. In addition, the touch controller 183 generates timing control signals for controlling operation timing of the first touch driver 181 and operation timing of the second touch driver 182.

The touch coordinate calculator 190 receives touch raw data TRD from the touch driver 180. The touch coordinate calculator 190 calculates touch coordinates in accordance with a touch coordination calculation method, and outputs touch coordinate data HIDxy including information as to the calculated touch coordinates to the host system 170.

The touch coordinate calculator 190 may be embodied using a microcontroller unit (MCU). The host system 170 analyzes the touch coordinate data HIDxy received from the touch coordinate calculator 190, and executes an application program linked to the coordinates at which touch has been generated by the user. The host system 170 transmits digital video data DATA and timing signals to the timing controller 160 in accordance with the executed application program.

The touch driver 180 may be included in the source driver 131 or may be mounted on the circuit board 150 after being manufactured in the form of a separate driving chip. The touch coordinate calculator 190 may be manufactured in the form of a driving chip, and may then be mounted on the circuit board 150.

Figure 3:
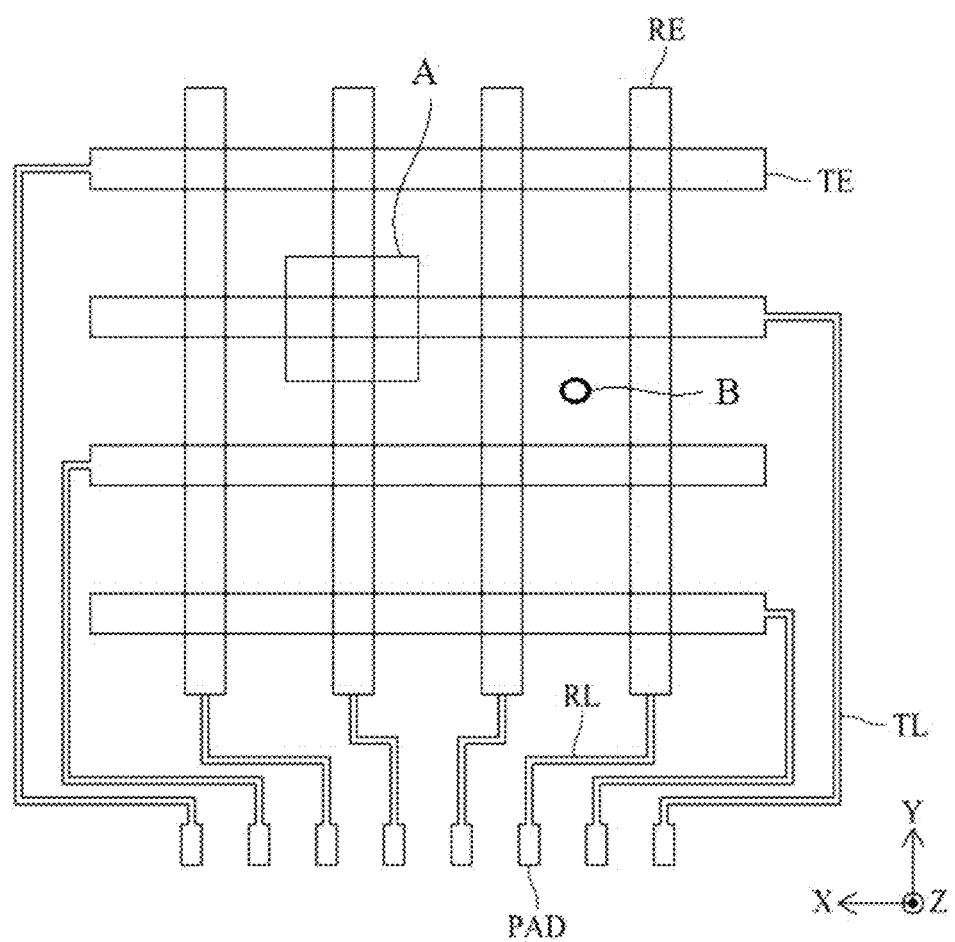
FIG. 3 is a schematic diagram illustrating the layout of a touchscreen panel in the touchscreen integrated display device according to a first aspect of the present disclosure.
Figure 4:
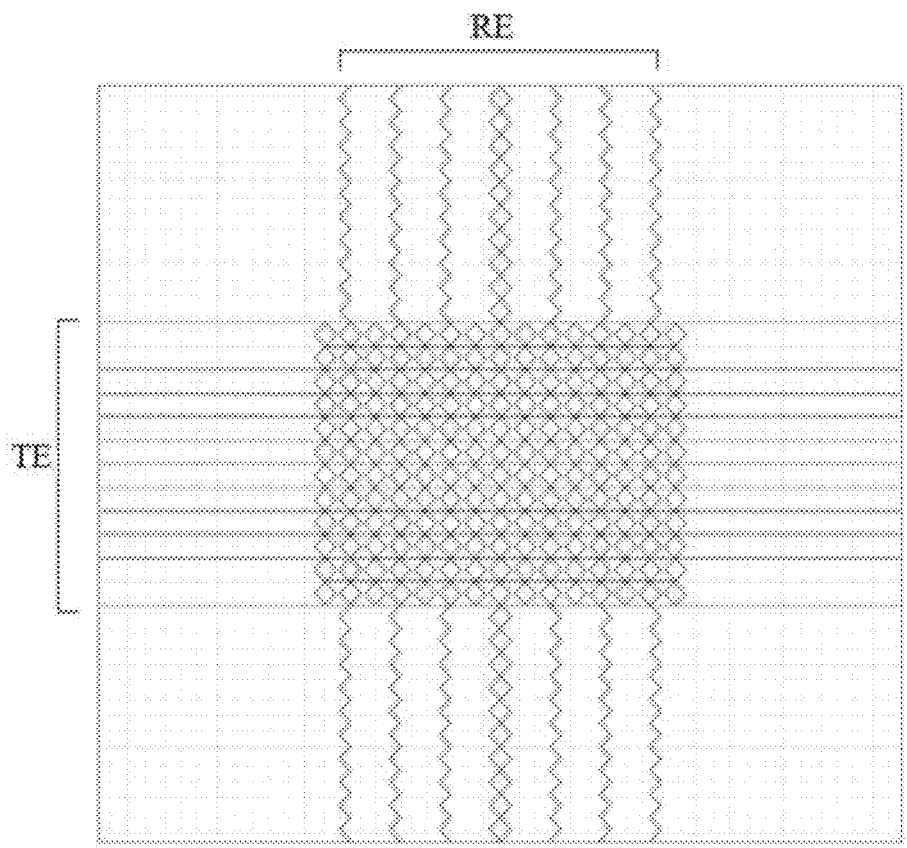
FIG. 4 is a diagram illustrating a detailed configuration of a portion A in FIG. 3.

FIG. 3 is a schematic diagram illustrating the layout of a touchscreen panel in the touchscreen integrated display device according to a first aspect of the present disclosure. FIG. 4 is a diagram illustrating a detailed configuration of a portion A in FIG. 3.

As illustrated in FIG. 3, the touchscreen of the touchscreen integrated display device according to the first aspect of the present disclosure includes first touch electrodes TE and second touch electrodes RE. The first touch electrodes TE extend in a first direction (x-axis direction) and, as such, have line or bar shapes, respectively. The second touch electrodes RE extend in a second direction (y-axis direction) and, as such, have line or bar shapes, respectively. The first direction (x-axis direction) may be a direction parallel to the scan lines S1 to Sn, and the second direction (y-axis direction) may be a direction parallel to the data lines D1 to Dm. Alternatively, the first direction (x-axis direction) may be the direction parallel to the data lines D1 to Dm, and the second direction (y-axis direction) may be the direction parallel to the scan lines S1 to Sn.

Meanwhile, an insulating film (not shown) may be interposed between the first touch electrodes TE and the second touch electrodes RE, to electrically insulate the first touch electrodes TE and the second touch electrodes RE from each other. In addition, neighboring ones of the first touch electrodes TE extending in the first direction are electrically insulated from each other, and neighboring ones of the second touch electrodes RE extending in the second direction are electrically insulated from each other.

Each of the first touch electrodes TE extending in the first direction may be connected, at one end thereof, to a corresponding one of the first touch lines TL. Each first touch line TL may be connected to the first touch driver 181 via a pad PAD. Accordingly, the first touch electrodes TE may receive drive pulses from the first touch driver 181 via the first touch lines TL, respectively.

Each of the second touch electrodes RE extending in the second direction may be connected, at one end thereof, to a corresponding one of the second touch lines RL. Each second touch line RL may be connected to the second touch driver 182 via a pad PAD. Accordingly, the second touch driver 182 may receive charge variations at respective touch points of the second touch electrodes RE.

In this case, each of the first touch electrodes TE having line or bar shapes has a metal mesh structure constituted by a plurality of lines, and each of the second touch electrodes RE having line or bar shapes has a metal mesh structure constituted by a plurality of lines, as illustrated in FIG. 4.

Accordingly, the touchscreen panel in which the first and second touch electrodes TE and RE having line or bar shapes are arranged to form the above-described metal mesh structure, as illustrated in FIGS. 3 and 4, exhibit a finger touch performance that is not bad. However, there may be a weak point exhibiting a weak sensing force upon touch of an active pen in an area where neither the first touch electrode TE nor the second touch electrode RE is arranged, as in a point B in FIG. 3.

To this end, the present disclosure proposes a touchscreen panel capable of achieving an enhancement in active pen touch performance while securing a desired finger touch performance, and a touchscreen integrated display device using the same.

Figure 5:
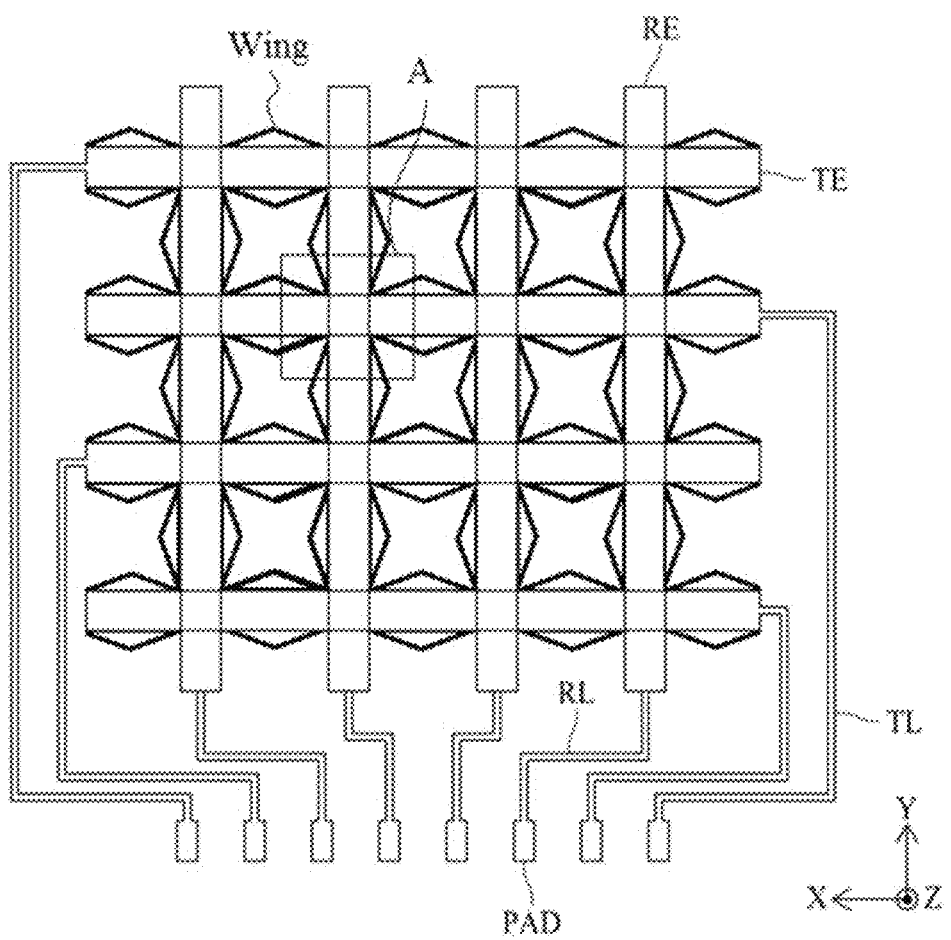
FIG. 5 is a schematic diagram illustrating the layout of a touchscreen panel in the touchscreen integrated display device according to a second aspect of the present disclosure.
Figure 6:
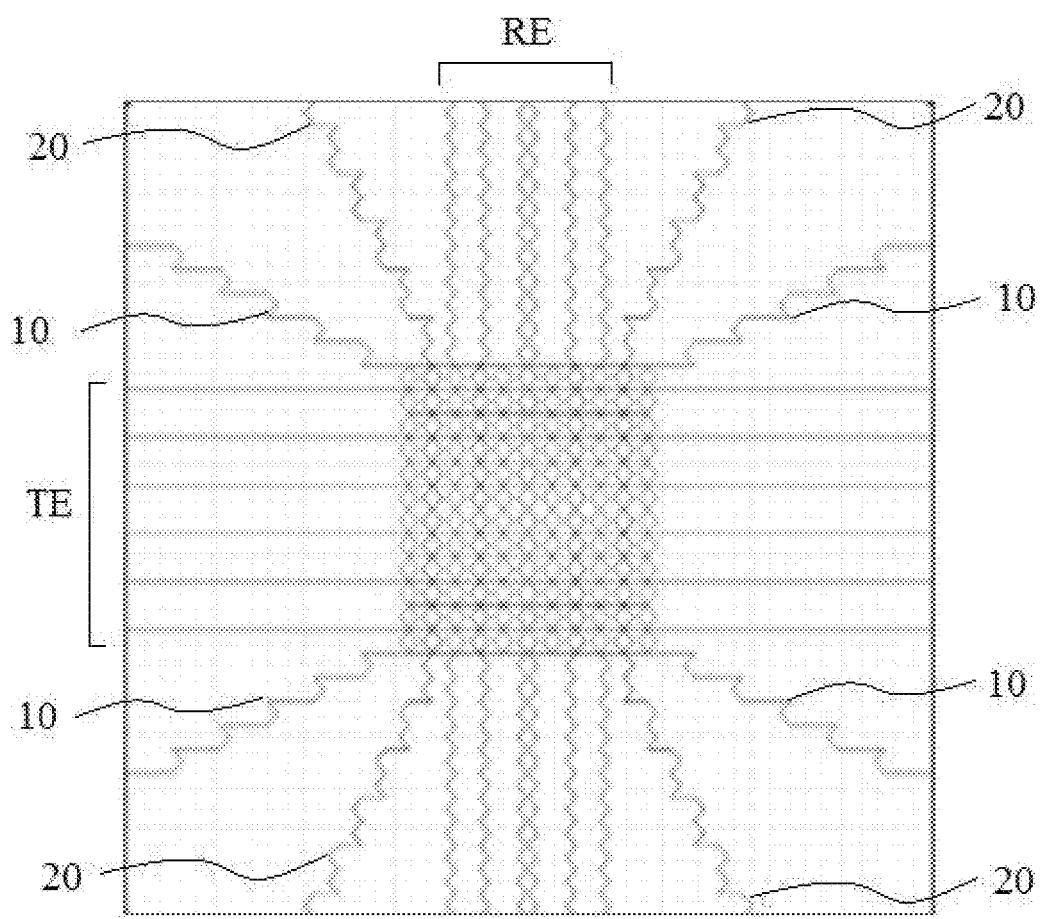
FIG. 6 is a diagram illustrating a detailed configuration of a portion A in FIG. 5.

FIG. 5 is a schematic diagram illustrating the layout of a touchscreen panel in the touchscreen integrated display device according to a second aspect of the present disclosure. FIG. 6 is a diagram illustrating a detailed configuration of a portion A in FIG. 5.

As illustrated in FIG. 5, the touchscreen panel of the touchscreen integrated display device according to the second aspect of the present disclosure has a touchscreen panel structure different from that of the touchscreen panel structure according to the first aspect in that wing patterns are further provided, in accordance with the second aspect, at the first and second touch electrodes TE and RE having line or bar shapes in the touchscreen panel structure according to the first aspect.

That is, as illustrated in FIGS. 5 and 6, the touchscreen of the touchscreen integrated display device according to the second aspect of the present disclosure includes first touch electrodes TE and second touch electrodes RE. The first touch electrodes TE extend in a first direction (x-axis direction) and, as such, have line or bar shapes, respectively. The second touch electrodes RE extend in a second direction (y-axis direction) and, as such, have line or bar shapes, respectively. The first direction (x-axis direction) may be a direction parallel to the scan lines S1 to Sn, and the second direction (y-axis direction) may be a direction parallel to the data lines D1 to Dm. Alternatively, the first direction (x-axis direction) may be the direction parallel to the data lines D1 to Dm, and the second direction (y-axis direction) may be the direction parallel to the scan lines S1 to Sn.

Meanwhile, an insulating film (not shown) may be interposed between the first touch electrodes TE and the second touch electrodes RE, to electrically insulate the first touch electrodes TE and the second touch electrodes RE from each other. In addition, neighboring ones of the first touch electrodes TE extending in the first direction are electrically insulated from each other, and neighboring ones of the second touch electrodes RE extending in the second direction are electrically insulated from each other.

Each of the first touch electrodes TE extending in the first direction may be connected, at one end thereof, to a corresponding one of the first touch lines TL. Each first touch line TL may be connected to the first touch driver 181 via a pad PAD. Accordingly, the first touch electrodes TE may receive drive pulses from the first touch driver 181 via the first touch lines TL, respectively.

Each of the second touch electrodes RE extending in the second direction may be connected, at one end thereof, to a corresponding one of the second touch lines RL. Each second touch line RL may be connected to the second touch driver 182 via a pad PAD. Accordingly, the second touch driver 182 may receive charge variations at respective touch points of the second touch electrodes RE.

In this case, each of the first touch electrodes TE having line or bar shapes has a metal mesh structure constituted by a plurality of lines, and each of the second touch electrodes RE having line or bar shapes has a metal mesh structure constituted by a plurality of lines.

Although the first touch electrodes TE having bar shapes and the second touch electrodes RE having bar shapes are illustrated as being formed on different layers in the case of FIG. 5, the present disclosure is not limited thereto. For example, the first touch electrodes TE having bar shapes and the second touch electrodes RE having bar shapes may be formed on the same layer.

That is, the first touch electrodes TE having bar shapes extend continuously in the first direction, and the second touch electrodes RE having bar shapes extend intermittently in the second direction such that each second touch electrode RE has portions each arranged between neighboring ones of the first touch electrodes TE. Adjacent ones of the portions of each second touch electrode RE may be electrically connected by a bridge.

On the contrary, the second touch electrodes RE having bar shapes extend continuously in the second direction, and the first touch electrodes TE having bar shapes extend intermittently in the first direction such that each first touch electrode TE has portions each arranged between neighboring ones of the second touch electrodes RE. Adjacent ones of the portions of each first touch electrode TE may be electrically connected by a bridge.

At regions where the first touch electrodes TE and the second touch electrodes RE do not overlap with each other, first wing patterns 10 are formed at opposite longitudinal sides of each first touch electrode TE, and second wing patterns 20 are formed at opposite longitudinal sides of each second touch electrode RE.

The first wing patterns 10 are electrically connected to the first touch electrode TE at regions where the first touch electrode TE overlaps with the second touch electrodes RE, respectively. That is, one end of each first wing pattern 10 is electrically connected to the first touch electrode TE at a first region where the first touch electrode TE overlaps with the second touch electrodes RE, and the other end of each first wing pattern 10 is electrically connected to the first touch electrode TE at a second region where the first touch electrode TE overlaps with the second touch electrodes RE. A distance between the first wing pattern 10 and the first touch electrode TE increase as the first wing pattern 10 extends away from the region where the first touch electrode TE overlaps with the second touch electrode RE.

Similarly, the second wing patterns 20 are electrically connected to the second touch electrode RE at regions where the second touch electrode RE overlaps with the first touch electrodes TE, respectively. That is, one end of each second wing pattern 20 is electrically connected to the second touch electrode RE at a first region where the second touch electrode RE overlaps with the first touch electrode TE, and the other end of each second wing pattern 20 is electrically connected to the second touch electrode RE at a second region where the second touch electrode RE overlaps with the second touch electrode TE. A distance between the second wing pattern 20 and the second touch electrode RE increases as the second wing pattern 20 extends away from the region where the second touch electrode RE overlaps with the first touch electrode TE.

That is, the first and second wing patterns 10 and 20 provide effects of reducing spacings of the first and second touch electrodes TE and RE.

Although the first and second wing patterns 10 and 20 are illustrated as having a triangular shape in the case of FIG. 5, the present disclosure is not limited thereto. For example, the first and second wing patterns 10 and 20 may have a semi-oval shape or a polygonal shape such as a trapezoidal shape.

Although the case of FIG. 5 illustrates that one wing pattern 10 or 20 is formed at each longitudinal side of each first or second touch electrode TE or RE in each of the regions where the first and second touch electrodes TE and RE do not overlap with each other, the present disclosure is not limited thereto. For example, two or more wing patterns 10 or 20 may be formed.

Figure 7:
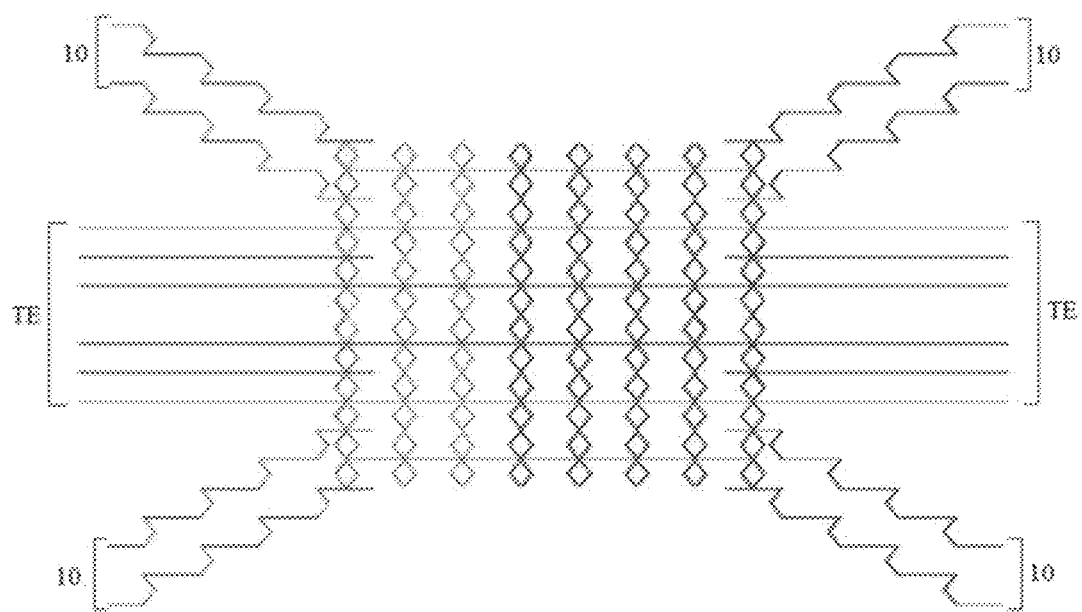
FIG. 7 is an enlarged diagram illustrating a detailed configuration of a portion A in FIG. 5 only in association with one first touch electrode TE and first wing patterns 10 associated therewith.

FIG. 7 is an enlarged diagram illustrating a detailed configuration of a portion A in FIG. 5 only in association with one first touch electrode TE and the first wing patterns 10 associated therewith.

Each first touch electrode TE of the touchscreen panel in the touchscreen integrated display device according to the second aspect of the present disclosure has a metal mesh structure constituted by a plurality of lines while having a bar shape. Each first touch electrode TE is arranged in a direction parallel to the scan lines S1 to Sn and, as such, the plurality of lines constituting the metal mesh structure of the first touch electrode TE have a linear shape, similarly to the scan lines S1 to Sn. The metal mesh structure of each first touch electrode TE has diamond-shaped metal meshes in a region where the first touch electrode TE overlaps with each second touch electrode RE. The lines of the metal mesh structure in each first touch electrode TE are electrically connected in the region where the first touch electrode TE overlaps with each second touch electrode RE.

Each first wing pattern 10 is electrically connected to a corresponding one of the first touch electrodes TE in a region where the corresponding first touch electrode TE overlaps with a corresponding one of the second touch electrodes RE. FIG. 7 illustrates the case in which each wing pattern 10 is constituted by two pattern lines.

In addition, the pattern lines of each first wing pattern 10 have a wave shape.

Figure 8:
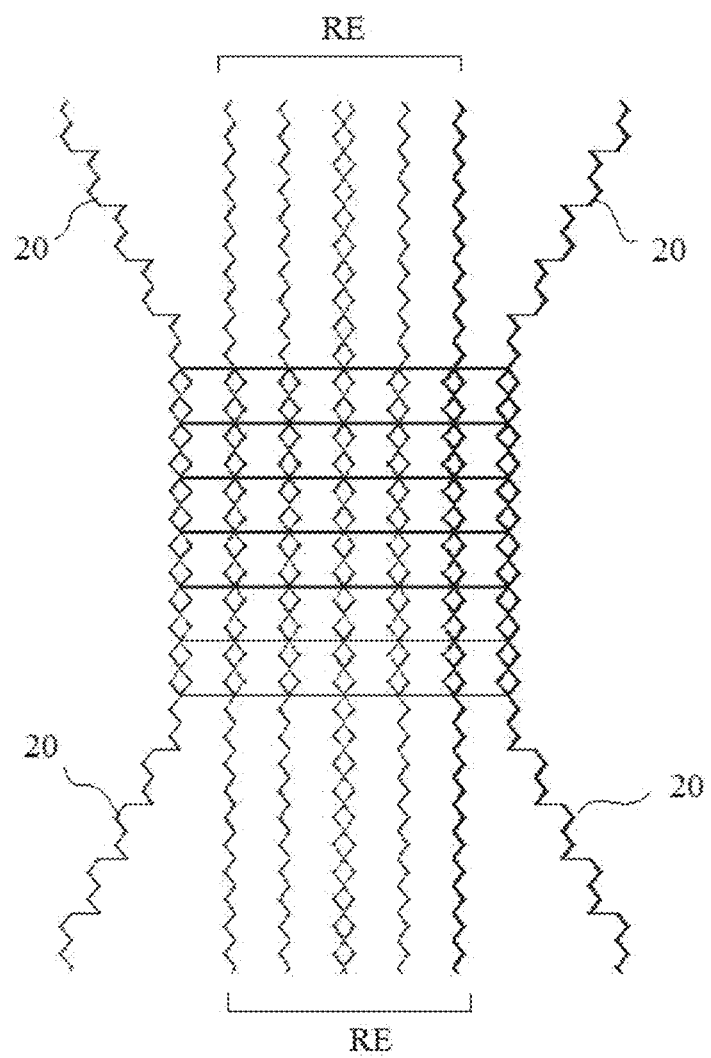
FIG. 8 is an enlarged diagram illustrating a detailed configuration of the portion A in FIG. 5 only in association with one second touch electrode RE and second wing patterns 20 associated therewith.

FIG. 8 is an enlarged diagram illustrating a detailed configuration of the portion A in FIG. 5 only in association with one second touch electrode RE and the second wing patterns 20 associated therewith.

Each second touch electrode RE of the touchscreen panel in the touchscreen integrated display device according to the second aspect of the present disclosure has a metal mesh structure constituted by a plurality of lines while having a bar shape. Each second touch electrode RE is arranged in a direction parallel to the data lines D1 to Dm and, as such, the plural lines constituting the metal mesh structure of the second touch electrode RE have a wave shape or a diamond line shape. The metal mesh structure of each second touch electrode RE has diamond-shaped metal meshes in a region where the second touch electrode RE overlaps with each first touch electrode TE. The lines of the metal mesh structure in each second touch electrode RE are electrically connected in the region where the second touch electrode RE overlaps with each first touch electrode TE.

Each second wing pattern 20 is electrically connected to a corresponding one of the second touch electrodes RE in a region where the corresponding second touch electrode RE overlaps with a corresponding one of the first touch electrodes TE. FIG. 8 illustrates the case in which each wing pattern 20 is constituted by a single pattern line.

In addition, the pattern line of each second wing pattern 20 has a wave shape.

The plurality of lines of the metal mesh structure in each first touch electrode TE described with reference to FIGS. 7 and 8 are arranged to be spaced apart from one another by a predetermined distance. Similarly, the plurality of lines of the metal mesh structure in each second touch electrode RE are arranged to be spaced apart from one another by a predetermined distance.

Accordingly, when the first touch electrodes TE and the second touch electrodes RE intersect each other, the lines of the metal mesh structure in each second touch electrode RE are arranged to have portions each arranged between neighboring ones of the lines of the metal mesh structure in each first touch electrode TE in a region where the second touch electrode RE overlaps with the first touch electrode TE, as illustrated in FIG. 6.

Figure 9:
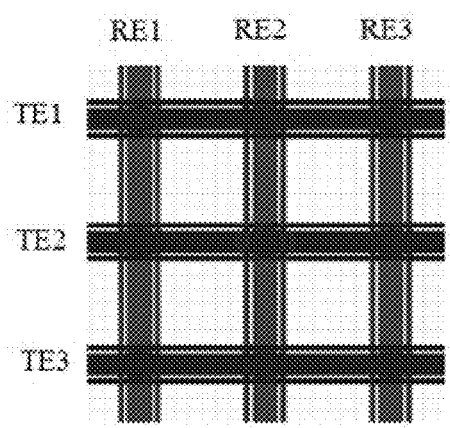
FIG. 9 is a schematic diagram illustrating a layout of the first and second touch electrodes explaining measure of a capacitance Cpen generated in accordance with a position of an active pen in the touchscreen panels according to the first and second aspects of the present disclosure.
Figure 9:
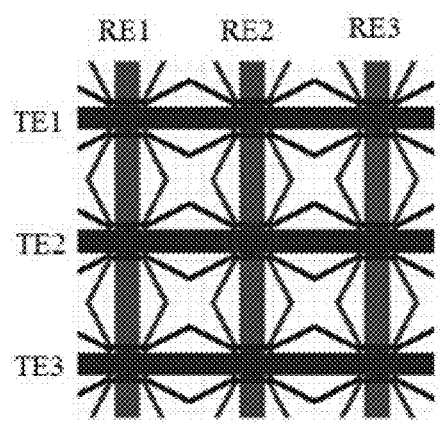
Figures 10, 11:
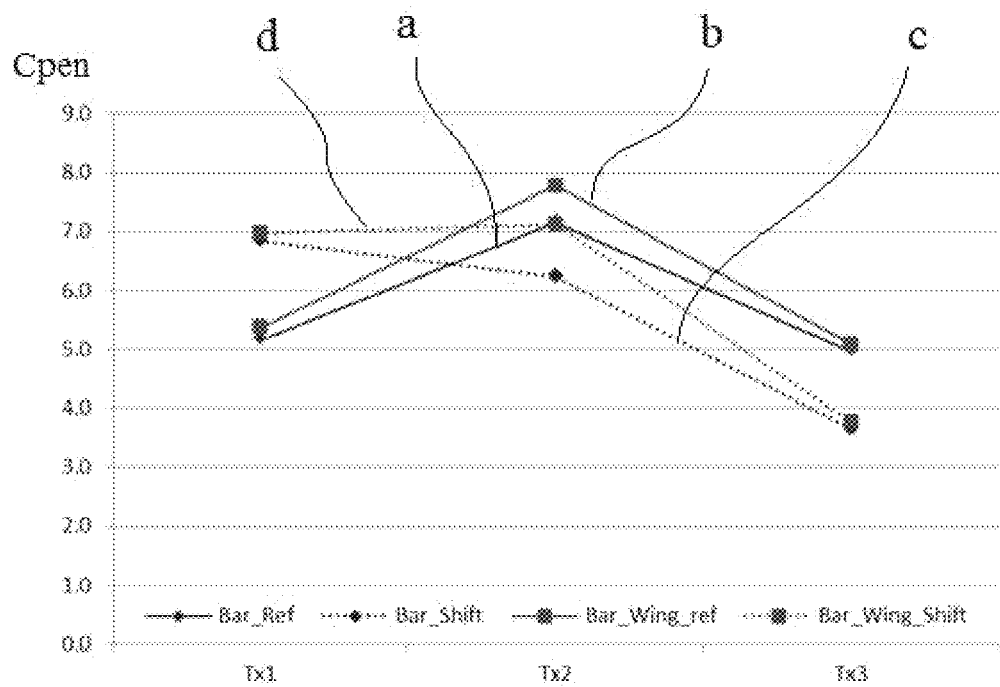
FIG. 10 shows graphs respectively depicting measured capacitances in the touchscreen panels according to the first and second aspects of the present disclosure.
FIG. 11 is a table arranging results exhibited through the graphs of FIG. 10.

FIG. 9 is a schematic diagram illustrating a layout of the first and second touch electrodes explaining measure of a capacitance Cpen generated in accordance with a position of an active pen in the touchscreen panels according to the first and second aspects of the present disclosure. FIG. 10 shows graphs respectively depicting measured capacitances in the touchscreen panels according to the first and second aspects of the present disclosure. FIG. 11 is a table arranging results exhibited through the graphs of FIG. 10.

Capacitances generated between the active pen and respective first touch electrodes TE1, TE2 and TE3 in the touchscreen panel according to the first aspect of the present disclosure were measured in the following manner.

First, in the touchscreen panel according to the first aspect of the present disclosure in which the first and second touch electrodes simply have bar shapes (bar type), as illustrated in FIG. 9, the active pen was disposed at a position where one of the first touch electrodes TE1, TE2 and TE3, namely, the first touch electrode TE2, and one of the second touch electrodes RE1, RE2 and RE3, namely, the second touch electrode RE2, overlap with each other. In this state, a capacitance between the active pen and the first touch electrode TE2, a capacitance between the active pen and the first touch electrode TE1, and a capacitance between the active pen and the first touch electrode TE3 were measured ("a" in FIG. 10).

In addition, in the touchscreen panel according to the second aspect of the present disclosure in which the first and second touch electrodes have bar shapes with wings (wing type), as illustrated in FIG. 9, the active pen was disposed at a position where one of the first touch electrodes TE1, TE2 and TE3, namely, the first touch electrode TE2, and one of the second touch electrodes RE1, RE2 and RE3, namely, the second touch electrode RE2, overlap with each other. In this state, a capacitance between the active pen and the first touch electrode TE2, a capacitance between the active pen and the first touch electrode TE1, and a capacitance between the active pen and the first touch electrode TE3 were measured ("b" in FIG. 10).

Meanwhile, in the bar type touchscreen pen according to the first aspect of the present disclosure illustrated in FIG. 9, the active pen was disposed between the second touch electrode TE2 and the first touch electrode TE1. In this state, a capacitance between the active pen and the first touch electrode TE2, a capacitance between the active pen and the first touch electrode TE1, and a capacitance between the active pen and the first touch electrode TE3 were measured ("c" in FIG. 10).

In addition, in the wing type touchscreen pen according to the second aspect of the present disclosure illustrated in FIG. 9, the active pen was disposed between the second touch electrode TE2 and the first touch electrode TE1. In this state, a capacitance between the active pen and the first touch electrode TE2, a capacitance between the active pen and the first touch electrode TE1, and a capacitance between the active pen and the first touch electrode TE3 were measured ("d" in FIG. 10).

Measured results depicted in FIGS. 9 and 10 may be arranged as in FIG. 11.

Referring to FIG. 11, under the condition that the active pen is disposed at the position where the first touch electrode TE2 and the second touch electrode RE2 overlap with each other (center position), the first aspect (bar type) exhibits a capacitance of 7.2 fF between the active pen and the first touch electrode TE2 and a capacitance of 5.2 fF between the active pen and the first touch electrode TE1 ("a" in FIG. 10), whereas the second aspect (wing type) exhibits a capacitance of 7.8 fF between the active pen and the first touch electrode TE2 and a capacitance of 5.4 fF between the active pen and the first touch electrode TE1 ("b" in FIG. 10).

In addition, under the condition that the active pen is disposed at a position between the first touch electrode TE2 and the first touch electrode TE1 (shifted position), the first aspect (bar type) exhibits a capacitance of 6.2 fF between the active pen and the first touch electrode TE2 and a capacitance of 6.9 fF between the active pen and the first touch electrode TE1 ("c" in FIG. 10), whereas the second aspect (wing type) exhibits a capacitance of 7.1 fF between the active pen and the first touch electrode TE2 and a capacitance of 7.0 fF between the active pen and the first touch electrode TE1 ("d" in FIG. 10).

Referring to FIG. 11, in either the touchscreen panel according to the first aspect of the present disclosure or the touchscreen panel according to the second aspect of the present disclosure, the capacitance between the active pen and the first touch electrode TE2 decreases when the active pen is disposed at the position between the first touch electrode TE2 and the first touch electrode TE1 (shifted position), as compared to the case in which the active pen is disposed at the position where the first touch electrode TE2 overlaps with the second touch electrode RE2 (center position). In either the touchscreen panel according to the first aspect of the present disclosure or the touchscreen panel according to the second aspect of the present disclosure, however, the capacitance between the active pen and the first touch electrode TE1 increases by about 29.8 to 32.7% when the active pen is disposed at the position between the first touch electrode TE2 and the first touch electrode TE1 (shifted position), as compared to the case in which the active pen is disposed at the position where the first touch electrode TE2 overlaps with the second touch electrode RE2 (center position).

In addition, both the capacitance between the active pen and the first touch electrode TE2 and the capacitance between the active pen and the first touch electrode TE1 in the touchscreen panel according to the second aspect of the present disclosure under the condition that the active pen is disposed at the position where the first touch electrode TE2 overlaps with the second touch electrode RE2 (center position) are greater than those of the touchscreen panel according to the first aspect of the present disclosure, respectively.

Furthermore, both the capacitance between the active pen and the first touch electrode TE2 and the capacitance between the active pen and the first touch electrode TE1 in the touchscreen panel according to the second aspect of the present disclosure under the condition that the active pen is disposed at the position between the first touch electrode TE2 and the first touch electrode TE1 (shifted position) are greater than those of the touchscreen panel according to the first aspect of the present disclosure, respectively.

As such, the active pen sensing performance Cpen in the touchscreen panel according to the second aspect of the present disclosure is superior to that of the touchscreen panel according to the first aspect of the present disclosure by virtue of formation of the wing patterns in the second aspect.

Figure 12:
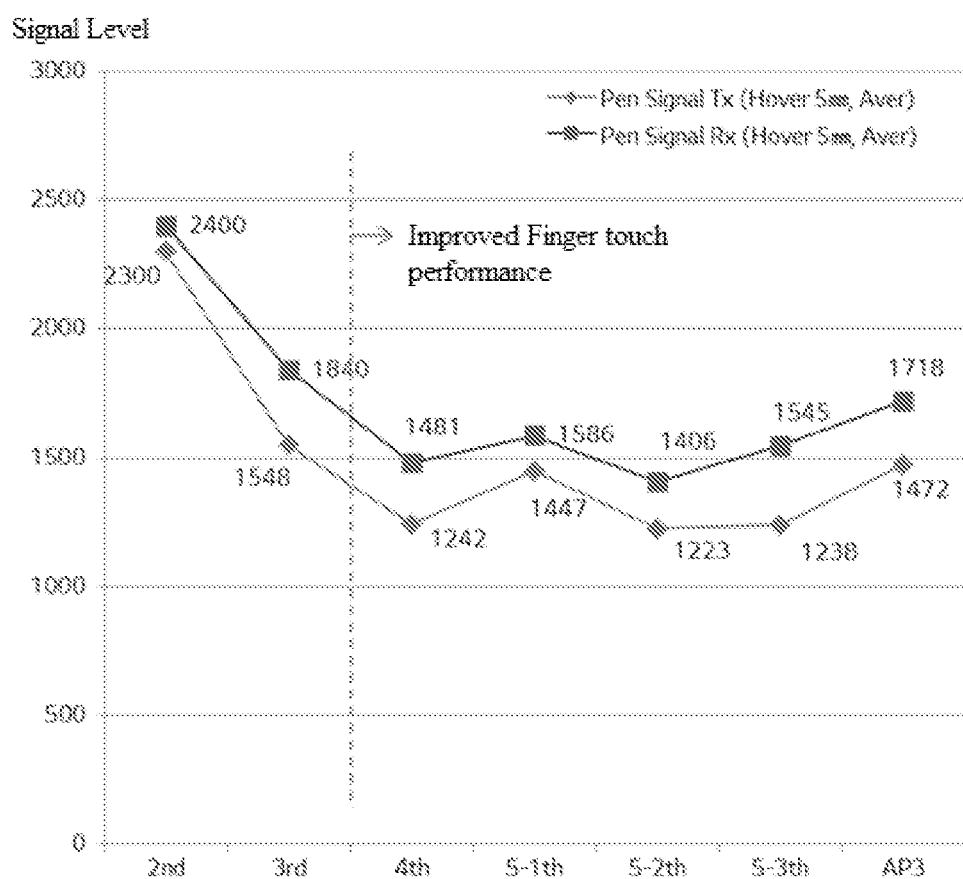
FIG. 12 shows graphs depicting comparison of active pen sensing signals in the touchscreen panels according to the first and second aspects of the present disclosure.

Meanwhile, FIG. 12 shows graphs depicting comparison of active pen sensing signals in the touchscreen panels according to the first and second aspects of the present disclosure.

In FIG. 12, "5-2-th" represents an active pen sensing signal in the touchscreen panel according to the first aspect of the present disclosure, and "AP3" represents an active pen sensing signal in the touchscreen panel according to the second aspect of the present disclosure.

Referring to FIG. 12, the active pen sensing signal in the touchscreen panel according to the second aspect of the present disclosure may be higher than that of the touchscreen panel according to the first aspect of the present disclosure.

As apparent from the above description, the touchscreen panel according to the present disclosure may have an enhanced active pen touch performance while securing a desired finger touch performance by arranging first and second touch electrodes having bar shapes to intersect each other, and forming first and second wing patterns at opposite longitudinal sides of the first and second touch electrodes in regions where the first touch electrodes and the second touch electrodes do not overlap each other.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A touchscreen panel comprising:
    first touch electrodes in a display area, each having a bar shape and extending in a first direction;
    second touch electrodes in the display area and insulated from the first touch electrodes, each having a bar shape and extending in a second direction, and including a portion that overlaps the first touch electrodes;
    first wing patterns in the display area and formed at both sides of each of the first touch electrodes in regions where the first touch electrode does not overlap the second touch electrodes; and
    second wing patterns in the display area and formed at both sides of each of the second touch electrodes in regions where the second touch electrode does not overlap with the first touch electrodes.

2. The touchscreen panel according to claim 1, wherein the first wing patterns are electrically connected to the first touch electrode in regions where the first touch electrode overlaps the second touch electrode, and the second wing patterns are electrically connected to the second touch electrode in regions where the second touch electrode overlaps the first touch electrode.

3. The touchscreen panel according to claim 1, wherein a distance between the first wing pattern and the first touch electrode increase as the first wing pattern extends away from the regions where the first touch electrode overlaps the second touch electrode, and a distance between the second wing pattern and the second touch electrode increase as the second wing pattern extends away from the region where the second touch electrode overlaps the first touch electrode.

4. The touchscreen panel according to claim 1, wherein each of the first and second wing patterns has a triangular shape, a semi-oval shape, or a polygonal shape.

5. The touchscreen panel according to claim 1, wherein at least two of the first wing patterns and at least two of the second wing patterns are located in a region where the first touch electrode does not overlap the second touch electrode.

6. The touchscreen panel according to claim 1, wherein each of the first and second touch electrodes has a metal mesh structure with a plurality of lines.

7. The touchscreen panel according to claim 6, wherein the first touch electrodes are arranged in a direction parallel to scan lines of a display panel, and the plurality of lines constituting the metal mesh structure in each of the first touch electrodes have a linear shape.

8. The touchscreen panel according to claim 6, wherein the second touch electrodes are arranged in a direction parallel to data lines of a display panel, and the plurality of lines constituting the metal mesh structure in each of the second touch electrodes have a wave shape or a diamond line shape.

9. The touchscreen panel according to claim 1, wherein the first or second wing pattern has a wave shape.

10. A touchscreen integrated display device comprising:
a display panel displaying an image and including a display area and a non-display area; and
a touchscreen panel attached to the display panel and recognizing touch of a user,
wherein the touchscreen panel comprises:
first touch electrodes in the display area, each extending in a first direction and having a bar shape;
second touch electrodes in the display area and insulated from the first touch electrodes, each of the second touch electrodes extending in a second direction and having a bar shape, and overlapping the first touch electrodes at predetermined portions thereof;
first wing patterns in the display area and formed at both sides of each of the first touch electrodes in regions where the first touch electrode does not overlap the second touch electrodes; and
second wing patterns in the display area and formed at both sides of each of the second touch electrodes in regions where the second touch electrode does not overlap the first touch electrodes.

11. The touchscreen integrated display device according to claim 10, wherein the display panel comprises a liquid crystal display panel or an organic light emitting display panel.

12. The touchscreen integrated display device according to claim 10, wherein the first wing patterns are electrically connected to the first touch electrode in regions where the first touch electrode overlaps the second touch electrode, and the second wing patterns are electrically connected to the second touch electrode in regions where the second touch electrode overlaps the first touch electrodes.

13. The touchscreen panel according to claim 10, wherein a distance between the first wing pattern and the first touch electrode increase as the first wing pattern extends away from the regions where the first touch electrode overlaps the second touch electrode, and a distance between the second wing pattern and the second touch electrode increase as the second wing pattern extends away from the region where the second touch electrode overlaps the first touch electrode.

14. The touchscreen panel according to claim 10, wherein each of the first and second wing patterns has a triangular shape, a semi-oval shape, or a polygonal shape.

15. The touchscreen panel according to claim 10, wherein at least two of the first wing patterns and at least two of the second wing patterns are located in a region where the first touch electrode does not overlap the second touch electrode.

16. The touchscreen panel according to claim 10, wherein each of the first and second touch electrodes has a metal mesh structure with a plurality of lines.

17. The touchscreen panel according to claim 16, wherein the first touch electrodes are arranged in a direction parallel to scan lines of the display panel, and the plurality of lines constituting the metal mesh structure in each of the first touch electrodes have a linear shape.

18. The touchscreen panel according to claim 16, wherein the second touch electrodes are arranged in a direction parallel to data lines of the display panel, and the plurality of lines constituting the metal mesh structure in each of the second touch electrodes have a wave shape or a diamond line shape.

19. The touchscreen panel according to claim 10, wherein the first or second wing pattern has a wave shape.

* * * * *